Jan. 6, 1948.  S. K. WELLMAN  2,434,237
APPARATUS FOR APPLYING POWDERED METAL BRIQUETS
TO CURVED METALLIC SURFACES
Filed Sept. 13, 1943    2 Sheets-Sheet 2
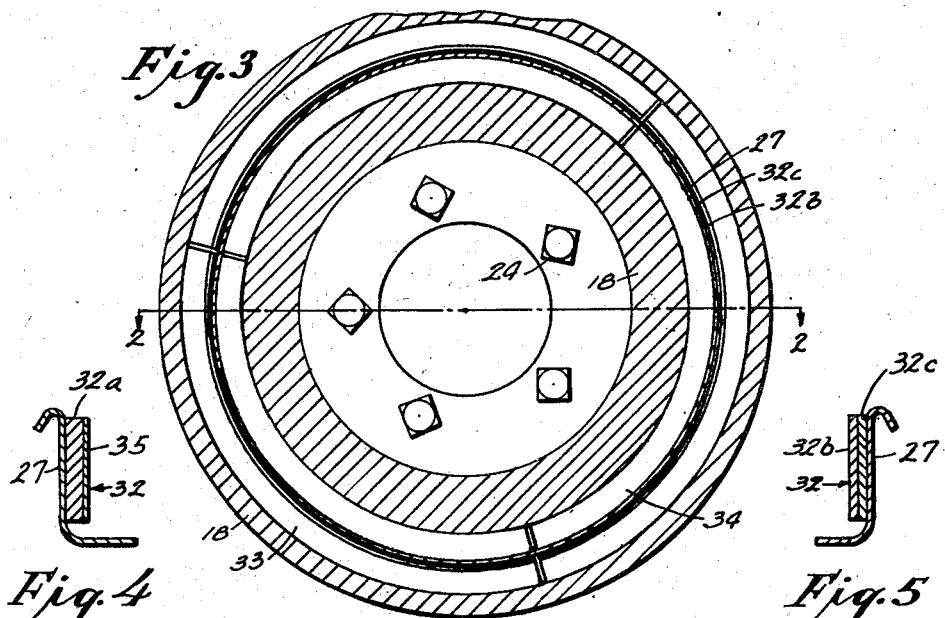

INVENTOR.
S. K. Wellman
BY
C. Thomas Cox
Att'ys Patented Jan. 6, 1948

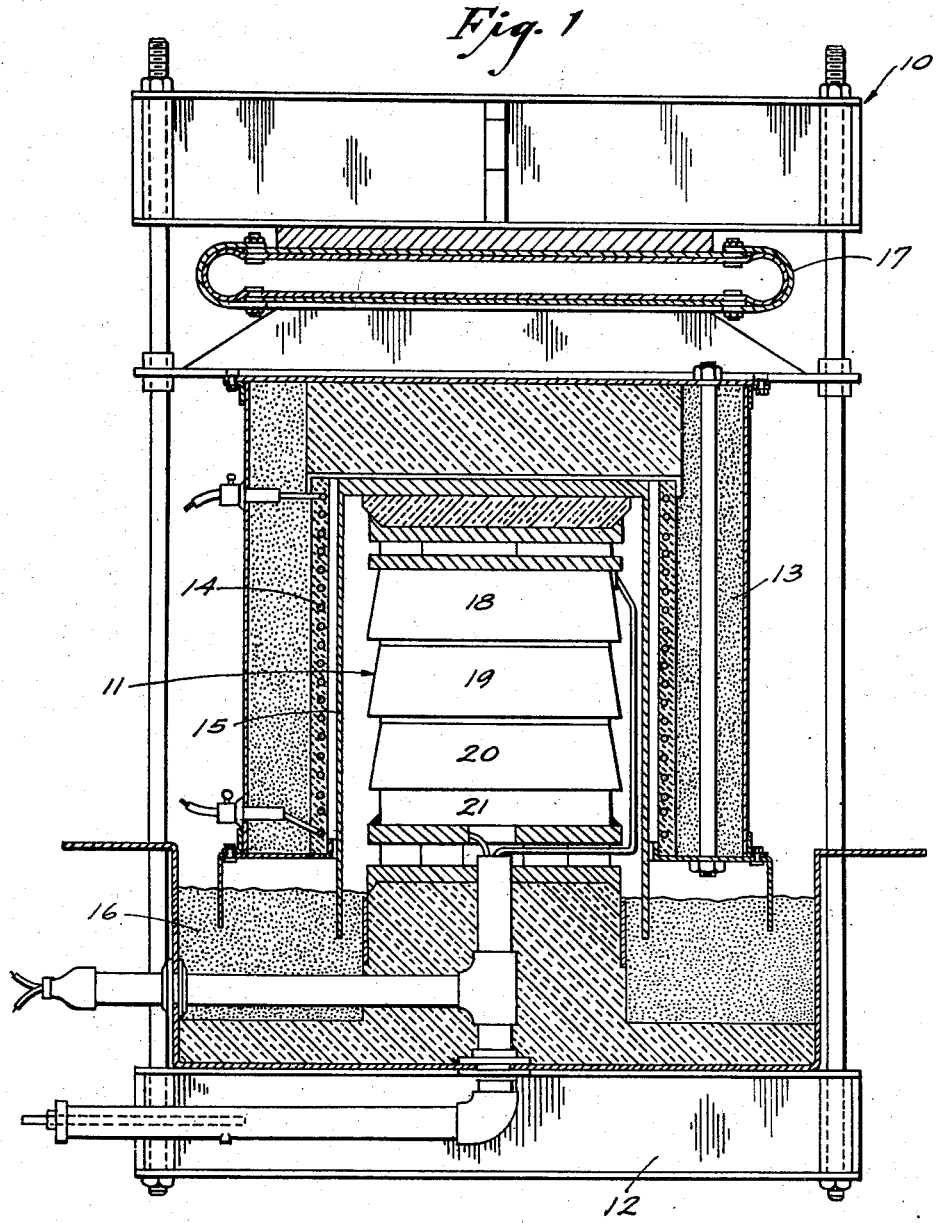

2,434,237

UNITED STATES PATENT OFFICE 2,434,237

APPARATUS FOR APPLYING POWDERED METAL BRIQUETS TO CURVED METALLIC SURFACES

Samuel K. Wellman, Cleveland Heights, Ohio, assignor to The S. K. Wellman Company, Cleveland, Ohio, a corporation of Ohio Application September 13, 1943, Serial No. 502,226

5 Claims. (Cl. 266—1)

This invention relates to apparatus for applying powdered metal briquets to curved surfaces, and more especially for applying brake liners to brake drums for vehicles and the like.

One of the objects of the invention is the provision of a new and improved apparatus for applying brake liners to brake drums in such manner that the material of the liner becomes intimately bonded to the material of the drum.

A further object of the invention is the provision of a new and improved apparatus whereby a plurality of brake drums may have simultaneously bonded thereon brake liners formed from sintered powdered metal without distorting the brake drum flange.

A still further object of the invention is the provision of a new and improved apparatus for applying brake liners made from powdered metal to brake drums in an efficient, economical and expeditious manner, and with an apparatus that is simple in construction and that may be operated with a minimum of cost and labor.

Other and further objects and advantages of the invention will appear from the following description, taken in connection with the accompanying drawings in which Fig. 1 is a vertical section of a heat treating furnace, showing the brazing apparatus in position therein;

Fig. 2 is a vertical section of the brazing apparatus, on the line 2—2 of Fig. 3;

Fig. 3 is a section on the line 3—3 of Fig. 2;

Fig. 4 is a vertical section of a portion of an inverted brake drum, showing the brake liners secured to the drum flange, and with a temporary reinforcing member in position thereon; and Fig. 5 is a view similar to Fig. 4, but showing the temporary reinforcing member removed.

It is well known that brake drums become scored and worn in use, resulting in uneven braking and rapid wear of the brake lining. The art has generally used a pressed steel brake drum or a cast iron brake drum, or combinations of the two. Steel has the requisite strength but lacks wear resistance. Cast iron has the necessary wear resistance but lacks strength. Therefore, it is common to provide a steel drum with a wearing surface layer of cast iron.

The present invention proposes to substitute a layer of sintered powdered metal for the cast iron lining in a pressed steel brake drum, in order to obtain better heat dissipation and the desired coefficient of friction, as may be predetermined.

Metal powder, if subjected to pressure to compact it into the desired shape (usually about eleven tons per square inch is used), will sinter together and unite to form a porous metallic article of considerable strength if heated to an elevated temperature below the melting point of the metal powder. This compressed and sintered powdered metal may be composed of a mixture of metallic and non-metallic ingredients, so that it is possible to control the physical properties of the same and obtain an excellent friction surface having the desired coefficient of friction and heat transferability. However, it is rather difficult to secure sintered powdered metal to a solid steel backing member or drum.

In order to accomplish this it is necessary that the surface of the drum be clean and smooth, and that it be metallized by a coat not readily oxidized, as by giving it a thin plating of a protective metal, such as copper or nickel. The plating may have a thickness of about .0001", and may serve primarily as a protective medium rather than as a brazing medium in that it prevents reoxidation of the steel after it has been carefully cleaned. If metal powder is pressed against the prepared surface of the brake drum with sufficient pressure, and heated to a sintering temperature while under pressure, it will bond thereto.

The sequence of operations may, therefore, be described as follows:

1. Press metal powder under a pressure of 11 tons per square inch to obtain a compact or briquet, which, for convenience of description, will hereinafter be termed a briquet.

2. Clean the surface of the brake drum and metallize this surface in any suitable manner, as by electroplating the same.

3. Place the briquet on the clean surface and press it thereagainst under pressure, say, around 250 pounds per square inch.

4. Heat the drum and briquet while under pressure to sintering temperature, which will vary for different materials but which will be somewhere around 1600° F. It is heated and pressed until the metal powder sinters together and bonds to the steel.

As an alternative, the metal powder briquet may be sintered prior to step 3, in which case the final heating step merely serves to bond the already sintered briquet to the steel drum.

The above sequence of operations constitutes the usual operating procedure in producing certain types of bimetallic metal, and is a conventional method in securing any powdered metal to a steel backing. In the case of annular surfaces, it is exceedingly difficult to keep the briquet pressed against the steel backing during the sintering and bonding operation, and the present invention is designed to accomplish this object.

For simplicity of disclosure the application of powdered metal briquets to brake drums has been selected to illustrate one embodiment of the invention; but it is understood that this is by way of example only, and that the invention contemplates the application of powdered briquets to curved surfaces wherever necessary or desirable.

Referring now to the drawing, the reference character 10 designates, generally, a heat treating furnace within which is mounted the brazing apparatus 11. The heat treating furnace 10 may be of any desirable construction, that shown being substantially the same as that disclosed in my Patent No. 2,258,431, of October 7, 1941, and which comprises a base portion 12, an intermediate or furnace covered structure 13 having top and side walls of refractory material, as is usual in such constructions. The intermediate portion is provided with electrical heating elements 14, and an air sealed member 15 extends over the brazing apparatus 11, with its side walls extending down into loose insulating material 16. Means for applying air pressure to the brazing apparatus is shown at 17.

Since the details of the heat treating furnace constitute no part of the present invention, it is not thought necessary to further illustrate or describe the same.

The brazing apparatus 11, which is positioned within the furnace 10, comprises a plurality of separate superposed sections or units 18, 19, 20 and 21, only four being shown; but the apparatus may be contracted or extended by removing one or more of the sections or by adding additional sections, as occasion may require, or for accommodating various sizes of heat treating furnaces. This is considered an important feature of the invention.

These sections are preferably, though not necessarily, duplicates of each other, except for the bottom or foundation member 21 which may be regarded as having its lower portion removed. Its upper portion may be substantially like the upper portion of the other sections. Each of these sections is provided on its upper surface with an annular stepped portion conforming to the brake drum, as shown in Fig. 2. In other words, each section is cylindrical in form and has a lower horizontal portion 22, on which the attaching flange 23 of a brake drum 20ª is adapted to rest and be clamped in position by suitable bolts or screws 24 extending through the attaching flange 23 into the section. Each section is provided with a top horizontal portion 25 above, and offset radially outwardly from, the horizontal portion 22, on which an offset portion 26 of the brake drum 20ª is adapted to seat. The brake drum flange 27 extends vertically upwardly from the top of the section to which it is attached.

The lower portion of each section, except the lower or base section, is provided with means for positioning the brake liners or briquets on the brake flange, and for clamping the same in position during the heat treating operation. As shown, each of the upper sections is provided with a circular recess 28 extending upwardly from its bottom wall, and into which the drum flange 27 extends, as shown more clearly in Fig. 2 of the drawing. The recess 28 has upwardly converging walls 29 and 31. These walls are both shown as being inclined to the vertical and converge upwardly, but the wall opposite the briquet could, of course, be a vertical wall since it functions as an abutment wall reacting against the wedge on the opposite side of the brake flange. However, since the brazing apparatus is adapted to be used for creating opposite pressures against the brake drum flange, whether the briquet is secured to the inner or outer surface, it is preferred that both walls of the groove be inclined, as shown in Fig. 2.

With this arrangement the powdered metal briquets may be applied to either the inner or outer surface of the brake drum flange or to both sides, or some to one side of the drum flange and some to the other, simultaneously, as may be desired. By means of this arrangement pressure is applied to both sides of the brake flange, and consequently all danger of distorting the flange is eliminated.

The brake liners 32, or rather what is destined to become the brake liners, are of powdered metal and conform to the surface of the brake drum flange 27, to which they are bonded. These liners are first formed by applying pressure to powdered metal to form the same into the briquets 32ª (Figs. 4 and 5), and these briquets are bent to conform to the curvature of the surface of the brake drum flange, whether they be applied to the inner or outer surface thereof.

Suitable means are provided for applying lateral pressure to the briquets and applying pressure for reinforcing the brake drum flanges for preventing radial expansion or contraction of the same. As shown, a plurality of outer and inner curved wedge members 33 and 34, respectively, are employed for this purpose. The wedge members 33 and 34, which are segments of circular form, are adapted to be positioned within the circular recess 28. The wedge segments or members 33 engage the outer inclined wall 29 and the outer surface of the brake drum flange or the briquet, as the case may be, and the wedge members 34 engage the side of the inclined wall 31 and the flange 27 or the briquets, as the case may be, as shown in Fig. 2. It will thus be seen that downward pressure on the section 18 will cause the wedge members 33 and 34 to exert opposed lateral pressure on the brake flange and the briquets. The wedge members that contact the briquets should be coated with graphite to prevent the briquets from adhering thereto during the sintering operation. The sections of the brazing apparatus may be built up in like manner, one superposed on the other, to the capacity of the heat treating furnace. Each unit or section has a brake drum attached thereto in the same manner as described above.

When the parts have been assembled within the furnace, pressure and heat are applied—the heat being substantially that for sintering the briquets, and the pressure being sufficient to cause them to become bonded to the brake drum flange. Usually a pressure somewhere in the neighborhood of 250 pounds per square inch, with a temperature of around 1600° F., will be sufficient, but this will depend upon the nature of the powdered material constituting the briquets.

The brake liners may be attached to either the inner or outer side of the brake drum, as may be required. As shown in the lower section in Fig. 2, the liners 32 are illustrated as being applied to the inner side of the brake drum, while the upper one is on the outer side.

The briquets may consist of a single layer of powdered material, as shown at 32ª in Fig. 4, or they may be formed by two or more layers, as shown in Fig. 5. Where liners are attached to friction members on brake drums, the briquets are preferably, though not necessarily, formed of a plurality of layers. In Fig. 5 is shown a briquet of two layers 32ᵇ and 32ᶜ. The inner layer 32ᶜ, or layer in contact with the brake flange, is preferably of powdered copper because of its heat conductivity, so that heat generated by the braking operation is conducted away from the friction surface of the liners and thereby dissipated.

The brazing apparatus 11 may also be used to secure a bimetallic member to a brake drum by a conventional soldering or brazing operation. In other words, in the above description the powdered metal is bonded directly to the flange of the brake drum. It is also possible to first sinter and bond the briquet to a thin sheet metal or sheet copper backing member, and to solder or braze the backing member to the flange of the drum. Thus, for example, the pure copper layer 32ᶜ of Fig. 5 may be substituted by a solid copper member, the briquet being pressed and sintered and bonded to the copper backing in the usual manner. If the copper backing member and the flange of the drum are heavily plated with copper or tin and then assembled in the brazing fixture and heated, the sheet copper backing will be welded or brazed to the flange of the brake drum. However, it is preferred to secure the powdered metal directly to the flange of the drum.

It is to be observed that the embodiment shown secures powdered metal to a cylindrical surface, but that it is obvious that the surface may be inclined from the vertical in some instances, such as in cone-shaped brake drums.

It is to be noted that the wedges 33 serve to maintain the drum in proper position and to prevent warpage due to heat of the sintering operation. If this wedge is omitted the drum distorts badly and is not usable.

The composition of the facing or friction layer may vary for different uses and installations. The following mixture for the layers 32ª and 32ᵇ has been found to give satisfactory results:

| | Percent |
|---|---|
| Copper | 73 |
| Lead | 14 |
| Tin | 7 |
| Graphite | 6 |

The briquet must obviously conform to the shape of the flange of the brake drum in which it is to be secured. The only satisfactory manner in which this can be done is to form a flat rectangular briquet and then bend it to a curvature corresponding to the flange of the drum. Several such arcuate segments are placed end to end to form the complete lining for the flange.

Due to the danger of fracturing the briquets in curving the same, especially in the thicker briquets that may have been sintered, it has been found that if a temporary reinforcing member of thin sheet steel 35 (Fig. 4) be bonded onto the briquet it may be more easily bent to curvilinear form without fracturing or rupturing the material, and this may be done as disclosed in my Patent No. 2,289,311. This member may be removed or peeled off after the briquet has been bonded to the brake drum flange 27. This temporary reinforcing member may, if desired, be also used in the multi-layer briquet shown in Fig. 5.

It will thus be seen that the brazing apparatus comprises a plurality of similar units or sections that are superposed or built into a stack that may be increased or decreased in height, depending on the capacity of the furnace. It will also be observed that suitable pressure may be applied to the stack of sections by the use of the inclined walls of the grooves in cooperation with the wedge members, and that the brake drums are prevented from becoming distorted by the heat and pressure applied thereto.

It is thought from the foregoing, taken in connection with the accompanying drawings, that the operation and construction of my device will be apparent to those skilled in the art, and that changes in size, shape, proportion and details may be made without departing from the spirit and scope of the appended claims.

I claim as my invention:

1. In a pressure brazing apparatus, a base section, a plurality of removable sections superposed on the base section forming a stack, each of said sections being circular in cross-section and having its upper portion stepped, means for detachably connecting a brake drum to each stepped portion except the topmost one with the brake drum flange extending upwardly above its respective section, each removable section having an upwardly extending V-shape groove in its lower edge extending downward over the adjacent flange, and inner and outer sectional wedge members on opposite sides of each flange for engaging the side faces of said groove for clamping, pressing and bonding a plurality of powdered metal briquets against one side of each flange when heat and pressure is applied to said stack.

2. In a brazing apparatus for bonding powdered metal briquets to brake drum surfaces, an annular member having an annular stepped upper portion on which a brake drum having an upwardly extending drum flange is adapted to seat, a second annular member having an annular groove extending upwardly from its lower face adapted to seat over said flange, said groove having walls converging upwardly and with one of said walls inclined to the vertical, and segmental pressure members engaging the walls of said groove for preventing distortion of said flange and for clamping powdered metal briquets to said flange upon heating said apparatus and applying pressure along the axis of said annular members.

3. In a pressure brazing apparatus for brazing powdered metal briquets to the curved surface of articles comprising a base section, a plurality of removable sections adapted to be superposed on said base section to form a stack when assembled, means associated with each section for rigidly holding an article in position such that the curved surface extends axially of the stack, and means associated with each removable section for clamping, pressing and bonding a briquet against the curved surface of an article held by an adjacent section for bonding the briquets to the articles when heat and pressure is applied to said stack.

4. In a pressure brazing apparatus for brazing powdered metal briquets to the flanges of brake drums, a base section, a plurality of removable sections adapted to be superposed on said base section to form a stack when assembled, means for detachably connecting a brake drum to one end of each section with the flange extending toward an adjacent section, and means associated with each removable section for clamping, pressing and bonding a briquet against the flange of a drum held by an adjacent section for bonding the briquets to the flanges when heat and pressure is applied to said stack.

5. In a device of the class described, an elongated annular member having one end adapted to hold a flanged brake drum in position with the flange thereof extending axially outwardly from the member, an annular groove having converging walls disposed in the other end of said member and a plurality of wedge members adapted to cooperate with said groove to clamp powdered metal briquets against the flange of a brake drum.

SAMUEL K. WELLMAN.

REFERENCES CITED

The following references are of record in the file of this patent:

UNITED STATES PATENTS

| Number | Name | Date |
| --- | --- | --- |
| 1,911,726 | Tanner et al. | May 30, 1933 |
| 1,967,715 | Magruder | July 24, 1934 |
| 2,035,380 | Wilhelm | Mar. 24, 1936 |
| 2,080,348 | Truitt | May 11, 1937 |
| 2,106,904 | Wilhelm | Feb. 1, 1938 |
| 2,114,151 | Romig | Apr. 12, 1938 |
| 2,169,584 | Kelley | Aug. 15, 1938 |
| 2,276,353 | Thompson | Mar. 17, 1942 |
| 2,313,925 | Curtin | Mar. 16, 1943 |

Certificate of Correction

Patent No. 2,434,237. January 6, 1948.

SAMUEL K. WELLMAN

It is hereby certified that errors appear in the printed specification of the above numbered patent requiring correction as follows: Column 8, line 8, list of references cited, under the heading "UNITED STATES PATENTS" beginning with the numeral "1,911,726" strike out all to and including "Mar. 16, 1943" in line 16, and insert instead the following:

| Number | Name | Date |
|---|---|---|
| 493,897 | Robertson | Mar. 21, 1893 |
| 1,608,715 | Barr | Nov. 30, 1926 |
| 2,041,346 | Jaques | May 19, 1936 |
| 2,086,448 | Batie | July 6, 1937 |
| 2,154,014 | Sinclair | Apr. 11, 1939 |
| 2,169,281 | Pfanstiehl | Aug. 15, 1939 |
| 2,178,527 | Wellman | Oct. 31, 1939 |
| 2,287,952 | Tormyn | June 30, 1942 |
| 2,300,302 | Morin | Oct. 27, 1942 | and that the said Letters Patent should be read with these corrections therein that the same may conform to the record of the case in the Patent Office.

Signed and sealed this 6th day of April, A. D. 1948.

[SEAL]

THOMAS F. MURPHY,
*Assistant Commissioner of Patents.*